(12) United States Patent
Morano

(10) Patent No.: US 8,438,686 B2
(45) Date of Patent: May 14, 2013

(54) DEVICE FOR REMOVING INSECTS WITH DISPOSABLE PAPER

(75) Inventor: Louis Morano, East Brunswick, NJ (US)

(73) Assignee: Rising Universe, LLC, East Brunswick, NJ (US)

( * ) Notice: Subject to any disclaimer, the term of this patent is extended or adjusted under 35 U.S.C. 154(b) by 0 days.

(21) Appl. No.: 13/548,240

(22) Filed: Jul. 13, 2012

(65) Prior Publication Data

US 2013/0014333 A1    Jan. 17, 2013

Related U.S. Application Data

(60) Provisional application No. 61/572,383, filed on Jul. 15, 2011.

(51) Int. Cl.
*A47L 25/00* (2006.01)
*A01M 3/04* (2006.01)

(52) U.S. Cl.
USPC ........................ 15/104.002; 43/136

(58) Field of Classification Search . 15/104.002; 43/136
See application file for complete search history.

(56) References Cited

U.S. PATENT DOCUMENTS

| | | | | |
|---|---|---|---|---|
| 5,630,243 A | * | 5/1997 | Federico et al. | 15/104.94 |
| 6,279,262 B1 | * | 8/2001 | Walkemeyer | 43/134 |
| 6,862,770 B2 | * | 3/2005 | Severson | 15/104.002 |
| 7,165,355 B2 | * | 1/2007 | George et al. | 43/136 |
| 7,958,590 B2 | * | 6/2011 | Trefethren et al. | 15/147.1 |
| 2008/0040967 A1 | * | 2/2008 | Young | 43/136 |
| 2009/0100745 A1 | * | 4/2009 | Knight | 43/135 |
| 2009/0119855 A1 | * | 5/2009 | Dexter | 15/104.002 |
| 2012/0204372 A1 | * | 8/2012 | Kelly et al. | 15/210.1 |

* cited by examiner

*Primary Examiner* — Randall Chin
(74) *Attorney, Agent, or Firm* — Daniel Kirshner

(57) ABSTRACT

A device to remove pests from a living area that includes a disposable piece of paper attached thereto. Includes a flat flexible paddle-like head and an elongated handle. Attached to the head is a paper holding clip for holding the disposable paper. The disposable paper has lightly tacky adhesive glue on one side. The paper holding clip is squeezable to retain or release the paper. Connected to the paper holding clip is a trigger on the elongated handle to open the paper holding clip, thereby releasing the paper. To utilize the present invention, a user opens the jaws of the paper holding clip. The jaws are clamped down onto the paper. A user touches the tacky side of the paper to the pest. thereby adhering the pest. Utilizing the trigger and opening the paper holding clip, the paper having the adhered pest is dropped harmlessly into the trash.

1 Claim, 3 Drawing Sheets

DEVICE FOR REMOVING INSECTS WITH DISPOSABLE PAPER

CROSS REFERENCE IN RELATED APPLICATION

This application is related to and claims priority and a filing date of the Provisional Application bearing Application No. 61/572,383 and a filing date of Jul. 15, 2011.

FIELD OF THE INVENTION

The present invention is a device to remove insects or other pests from a living area. More specifically, the present invention device to remove insects includes an elongated handle, a insect removing head and disposable sheet of paper for disposing of the insect.

BACKGROUND OF THE INVENTION

Spiders, insects and other such crawling pests are an annoyance inside peoples' residences, particularly in warmer climates or warmer months. There are many, many prior art devices to rid the living area of insects. These prior art devices range from electronic zappers, to chemicals, to mechanical means for swatting insects.

One of the oldest and most popular means to rid a house of spiders, insects, or other crawling pests is the old-fashioned fly swatter. The fly swatter is a simple mechanical device that has an elongated handle and a flat fly swatting head to squash a bug.

One major disadvantage of the old-fashioned fly swatter is that the user is left with a dirty fly swatter with a squashed insect sitting on its face. This dirty fly swatter should be cleaned to prevent the exposure of people to the dirty, and possibly disease-ridden carcass of the bug. Moreover, cleaning the fly swatter and getting rid of the terminated insect is disgusting to most people.

As such, the present invention pest-removing device achieves the objective of providing a device to dispose of a crawling spider, insect or other such pest, without having to be touched by human hand.

SUMMARY OF THE INVENTION

The present invention is a device to remove spiders, crawling insects or other such pests from a living area that includes a disposable piece of paper attached thereto. The insect removing device of the present invention has a flat flexible paddle-like head and an elongated handle. Attached to the head of the paddle is a paper holding clip for holding the disposable paper in place. The disposable paper has lightly tacky adhesive glue, which covers about half the surface to which the insect adheres. The paper holding clip is squeezable to selectively retain or release the disposable paper. Attached to the paper holding clip is a trigger or a thumb-slide device which trigger or thumb-slide device is attached through the hollow inside of the elongated handle and emerges at the handle's proximal end. The trigger or thumb-slide device is employed thereby squeezing the paper holding clip, and thus releasing the piece of paper. To utilize the present invention device, a user opens the jaws of the paper holding clip by squeezing its squeezing member. Now the jaws are clamped down onto the paper. A user touches the tacky side of the disposable paper to the pest, thereby adhering the pest to the disposable paper. Now, utilizing the trigger, thereby squeezing, the squeezing member of the clip, the paper having the adhered pest is dropped harmlessly into the trash, the user never having to touch it.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

The present invention is a device to remove spiders, crawling insects or other such pests from a living area. The pest removing device of the present invention includes a disposable sheet of paper having one tacky side for disposing of the insect. The disposable sheet is removably clamped to the paddle-like head of the device and the sheet of paper can be released from the head without being touched by a human hand.

Looking now at the figures, the present invention pest removing device includes an insect removing head 12 for removing the insect, and an elongated handle 14 for a user to grasp. The user holds the handle at the proximal end, positions the head of the pest removing device over the pest to be disposed of, and touches the head of the device having a piece of tacky paper 16 attached thereto to the insect, thereby adhering the insect to the paper. As shown in the figures, the insect removing head is formed in the nature of a paddle and is generally square or rectangular flat piece, (other shaped heads are within the scope of this disclosure), and has a top face and a bottom face.

Figure 1:
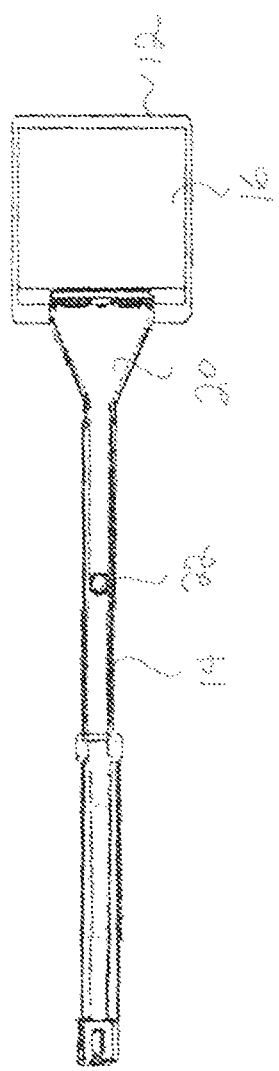
FIG. 1 is a top view of the present invention device for removing insects.
Figure 2:
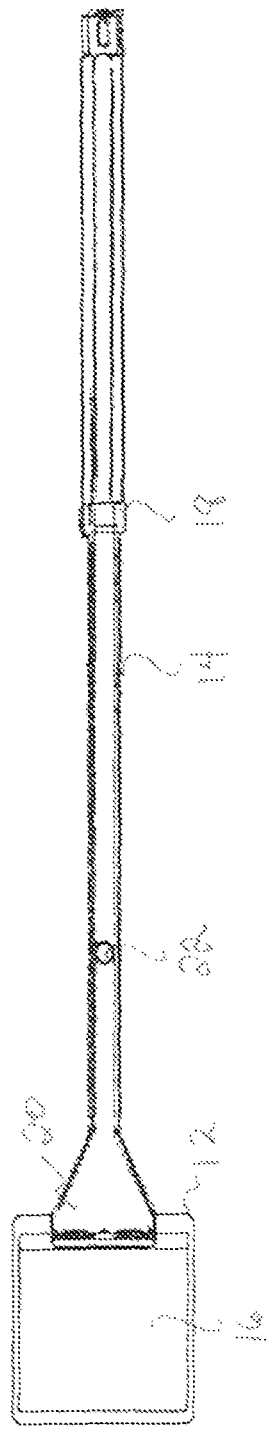
FIG. 2 is a top view of the present invention showing the handle telescoped out.
Figure 3:
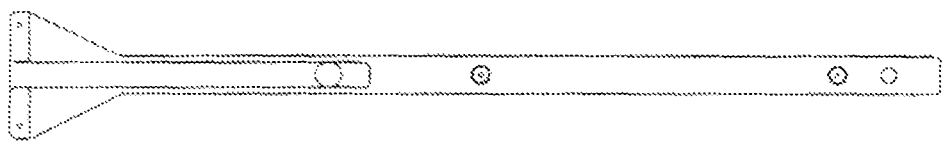
FIG. 3 is a side view of the front element of the elongate handle of the present invention

Looking more closely at the elongated handle, the handle is formed from two interconnected elongated members as seen best in FIG. 2. The two elements of the elongated handle telescope with relation to each other, thereby permitting the user to select the desired length of handle. The telescoping elements are locked together with at their desire length by employing the lock nut 18. Further, it a preferable for both of the telescoping members to be hollow thereby permitting the workings of the device's trigger mechanism to reside inside the handle. At its front, the elongated handle widens into a wing shape for attachment of the insect removing head.

Attached to the top face of the insect removing head is a paper holding clip 20. The paper holding clip is positioned on the face of the pest removing device and at its end nearest to the elongated handle. The paper holding clip of the embodiment shown in the drawings has two opposable jaws, which are clamped together in their normal closed resting position and a squeezing member. In one embodiment, the two jaws are held together in their normal resting position by a spring. When the squeezing member is squeezed, the pressure of the squeeze forces the two opposable jaws apart.

On the handle, and connected to the squeezing member of the paper holding clip is a trigger or a thumb-slide device 22 which is connected to the squeezing member inside through the hollow elongated handle 14. It will be understood that by engaging the trigger or a thumb-slide device, tension is transmitted to the squeezing member of the paper holding clip thereby causing it to be squeezed. As such, when a user engages the trigger, or a thumb-slide device and tension is transmitted to the squeezing member, the jaws of the paper holding clip are spread apart, thereby opening them. In one embodiment of the present invention, a string is to connect the trigger to the squeezing member.

To utilize the present invention, a piece of paper 16 which is cut to the approximate size and configuration of the head of the pest removing device is provided. On one surface of the paper there is lightly tacky adhesive glue. More specifically, the tacky paper of the present invention may be standard off-the-shelf stationery notes containing adhesive on one side to attachment to surfaces. The jaws of the paper holding clip are spread apart, and the piece of paper is put into position on the top face of the head of the device where the paper holding clip is attached. Of course, the tacky surface of the paper should be facing away from the head of the pest removing device. Now the paper is held into place on the head of the pest removing device by the paper holding clip.

Now, the user touches the tacky paper to the pest to be removed while holding the elongated handle. As such, the insect will be adhered to the tacky surface of the paper.

The user then positions the head of the device over the trash and activates the trigger at the proximal end of the elongated handle. By activating the trigger or a thumb-slide device, the jaws of the clip are spread apart thereby releasing the grip on the piece of paper. The paper, with the adhered insect stuck to the adhesive falls away, and harmlessly into the trash. As such, there is no need to touch the insect nor to make contact with a potentially dirty pest removing device.

The foregoing is considered as illustrative only of the principles and preferred embodiment of the invention. Furthermore, since numerous changes and modifications will readily occur to one skilled in the art, it is not desired to limit the invention to the exact construction, operation and embodiment shown and described, and accordingly all suitable modifications and equivalents may be resorted to, falling within the scope of the invention.

What is claimed:

1. A device for removing insects comprising:
   an elongated telescoping handle, said handle extending in a predetermined lengthwise direction;
   an insect removing head attached to said elongated handle, said insect removing head, being shaped as a flat paddle and having a top and a bottom surface, wherein said insect removing head extends outward as a paddle from said handle in the same predetermined lengthwise direction as said handle;
   a paper holding clip attached to said top surface of said insect removing head;
   a piece of paper, said paper being tacky on one surface, said piece of paper positioned onto said insect removing head thereby extending outward from said handle in the same predetermined lengthwise direction as said handle and removably held in place by said paper holding clip; and
   a trigger on said elongated handle, said trigger opening said paper holding clip and utilized to release said piece of paper from said insect removing head;
   whereby a user touches the said tacky surface of said paper to a pest, thereby adhering said pest to said paper, and whereby the user disposes of said paper by employment of said trigger releasing the paper.

\* \* \* \* \*